H. G. DAVIS

Dec. 25, 1928. OIL DISPENSING DEVICE Re. 17,168

2 Sheets-Sheet 1

Original Filed July 13, 1925

Inventor

Harold G. Davis.

By A. J. O'Brien

Attorney

Dec. 25, 1928. H. G. DAVIS Re. 17,168

OIL DISPENSING DEVICE

Original Filed July 13, 1925 2 Sheets-Sheet 2

Inventor

Harold G. Davis

By A. J. O'Brien

Attorney

Reissued Dec. 25, 1928. Re. 17,168

UNITED STATES PATENT OFFICE.

HAROLD G. DAVIS, OF DENVER, COLORADO, ASSIGNOR TO THE DAVIS AND SON MANUFACTURING COMPANY, OF DENVER, COLORADO, A CORPORATION OF COLORADO.

OIL-DISPENSING DEVICE.

Original No. 1,601,200, dated September 28, 1926, Serial No. 43,194, filed July 13, 1925. Application for reissue filed April 9, 1928. Serial No. 268,709.

This invention relates to improvements in oil dispensing devices.

Since the number of automobiles in this country became so numerous, the sale of oil and gasoline has become a large business and the method of dispensing the same has been systematized to a great extent. As greater quantities of gasoline are sold than oil, inventors have centered their efforts on the production of devices for dispensing gasoline with the result that only crude devices have been produced for use in dispensing oil. As the custom of buying oil in small quantities at the time that gasoline is bought instead of, as was usually done some time ago, buying oil in five gallon lots and storing the same in the garage, it becomes necessary to provide means whereby oil may be dispensed as conveniently as gasoline. As there are a large number of different grades of oil and different cars require different grades, it is necessary for filling stations to carry many different grades in stock which makes it more complicated than gasoline dispensing, as only one or two grades of gasoline are handled by each station.

It is the object of this invention to produce an oil dispensing device that shall be so constructed that a large number of different grades of oil can be readily handled and in which the oil may be stored in conveniently placed tanks located underground or at some other convenient place and connected to the dispensing device by means of pipes. The oil in the storage tanks may be subjected to air pressure of sufficient value to cause it to flow to the dispensing device and out through the molasses gates, with which the device is equipped, whenever the gates are opened. As the purchaser usually desires to see a sample of the oil before purchasing, a glass container is provided for each grade of oil. A glass tube of somewhat smaller external diameter than the inside diameter of the container is placed within the latter and the oil poured into the space between the container and the tube so as to form a thin layer. An incandescent lamp is placed within the tube so as to illuminate the interior whereby the color characteristics of the oil become clearly visible.

In order to describe my invention with greater clearness and particularity so that the construction and mode of operation can be more readily understood, reference will be had to the accompanying drawing in which the preferred construction thereof is shown and in which.

Figure 1:
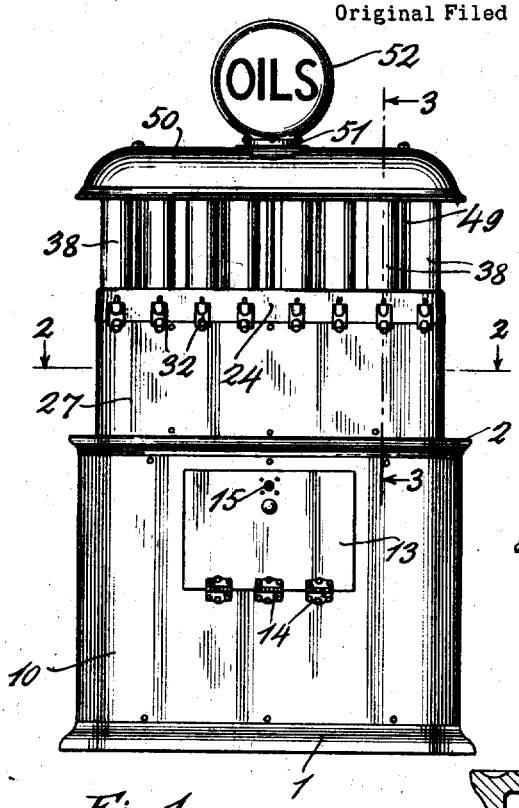
Fig. 1 is a view showing a side elevation of my improved dispensing device.

The invention comprises a base member 1 and a drain table 2 that are connected together and held in assembled relation by means of bolts 3 and spacer pipes 4. The bolts and spacers extend from lugs 6 on the drain table to lugs 7 on the base. The drain table has a downwardly extending flange 8 and the base a similar upwardly extending flange 9 to which the sheet metal sides 10 are secured by means of screws 11. The sides are formed from two sheets each of which extends one-half of the distance around and the joint between the abutting ends of the plate are covered by nickeled strips 12. One side 10 has an opening that is closed by means of a door 13 which is secured in place by means of hinges 14 and which may be held in locked position by means of a lock 15. Secured in horizontal position to the inside of each side is an angle iron 16 that supports the end of a transverse shelf member 17 which serves as a support for the measures which have been shown dotted. The shelf or support 17 is inclined towards the center and provided with a hole 18 through which oil may drain.

Figure 3:
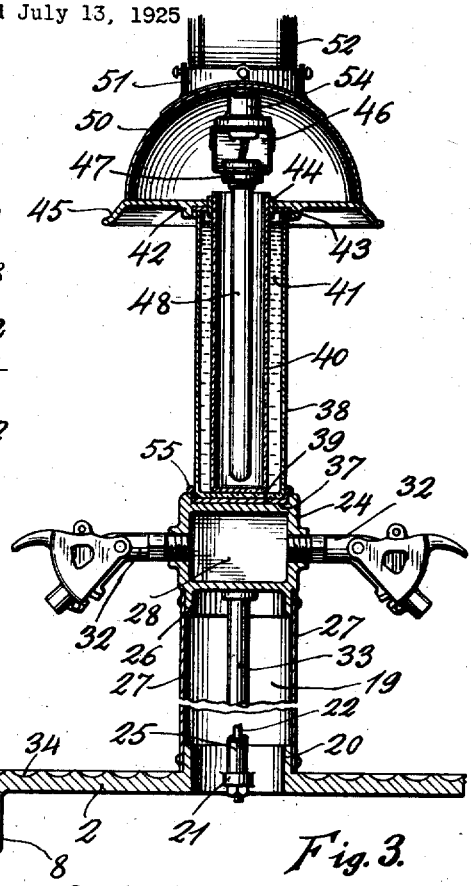
Fig. 3 is a vertical section taken on line 3—3, Fig. 1 showing the parts on a somewhat larger scale.
Figure 2:
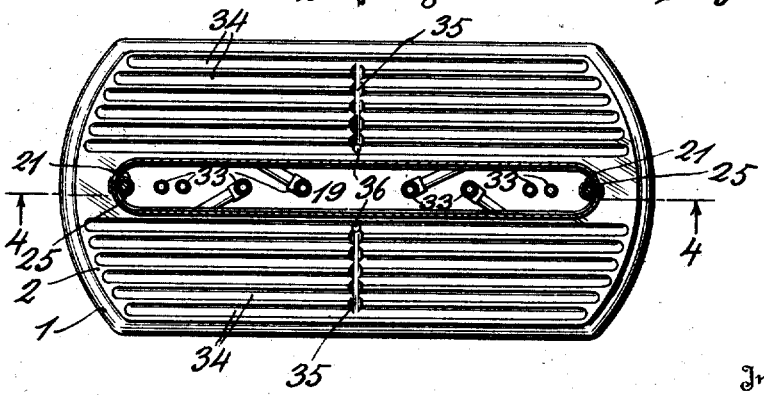
Fig. 2 is a section taken on line 2—2, Fig. 1.
Figure 4:
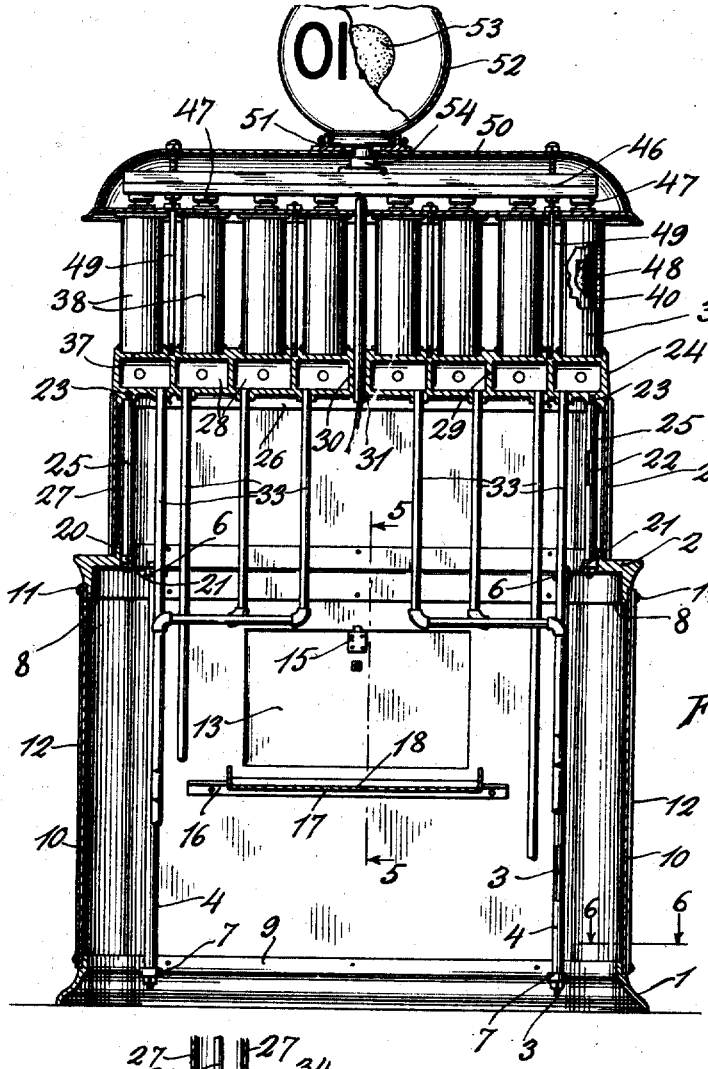
Fig. 4 is a section taken on line 4—4, Fig. 2.
Figure 5:
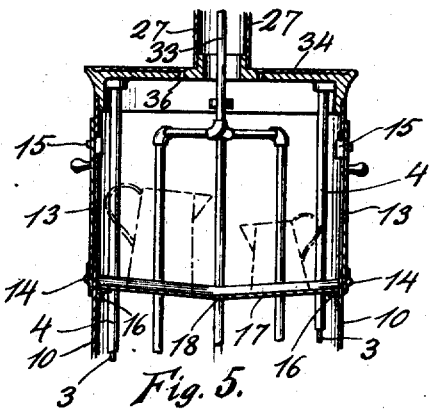
Fig. 5 is a section taken on line 5—5, Fig. 4.
Figure 6:
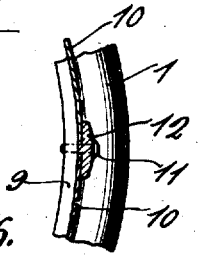
Fig. 6 is a section taken on line 6—6, Fig. 4.

The drain table 2 has a central longitudinal opening 19 that is surrounded by an upwardly extending flange 20. At each end of the opening 19 I have provided lugs 21 that are perforated for the reception of bolts 22 whose upper ends 23 are threadedly connected to the bottom of the dispensing head or manifold 24. Pipes 25 surround the bolts 22 and serve as spacers. The manifold 24 has a downwardly extending flange 26. Sheet metal sides 27 whose outer surfaces are nickel plated extend between the flanges 20 and 26 so as to form an enclosed space or chamber that extends from the table to the manifold. The dispensing head or manifold 24 is a hollow casting whose interior is divided into eight chambers 28 by means of transverse walls 29. The central transverse wall has been designated by the numeral 30 as it differs from the others and has an opening through which the electrical conduit 31 passes. The two opposite sides of each chamber have threaded openings for the reception of the molasses gates 32 (see Fig. 3) and the bottom of each chamber has a threaded opening for the reception of a supply pipe 33 whose other end is connected with the oil supply tank (not shown). In accordance with the usual practice followed in dispensing gasoline, the oil in the tanks is subjected to air pressure and when any one of the gates is open, oil will flow from the corresponding supply tank through the connecting pipe 33 into the chamber 28 in a manner common and well understood. The upper surface of the drain table 2 is provided with a plurality of parallel grooves 34 that connect with the central transverse grooves 35 whose inner ends terminate in holes 36. The grooves 34 slant towards the transverse groove so that any oil that may get onto the table will drain towards the transverse groove 35 and down through the holes 36. I want to call particular attention to the fact that my device is so constructed that oil can be drawn from both sides of each compartment at once so that the capacity for service is doubled over what it would be if each compartment had only a single outlet. If the object were merely to dispense oil the apparatus so far described would be sufficient, but as explained above, the purchaser always desires to see the oil before he buys. It is therefore desirable to have a sample of each grade of oil directly above the gates from which it is drawn. I have therefore provided the upper surface of the manifold with a circular depression 37 above each of the chambers 28. These depressions serve to receive the bottoms of the cylindrical glass containers 38 which are separated from the bottom of the depression by some spacer 39. Within the containers 38 I place glass tubes 40 which have one end open and the other end closed. The bottom of the tube 40 rests upon the bottom of the container within which it is placed and is of such length that its upper end projects above the upper end of the container. The outer diameter of the tube 40 is slightly less than the interior diameter of the container whereby an annular cylindrical space 41 is formed for the reception of the oil. A top casting 42 is provided with recesses 43 of the proper size to receive the upper ends of the containers 38 and concentric openings 44 through which the upper ends of the tubes 40 extend. The ends of the containers 38 and the sides of the tubes 40 are spaced from the adjacent metal surfaces by washers and rings of yielding material. The top member 42 has an outer flange 45. In order to display the oil samples to the best advantage, it is necessary to place an electric lamp inside of each of the tubes 40 and for this purpose I have provided a bar 46 to the underside of which I have secured electric sockets 47 each of which is located directly above one of the tubes 40. Secured to each socket is an elongated lamp 48 of the type which has one long filament that extends the whole length of the lamp. The bar 46 is secured to the holding bolts 49 which also serve to hold the top member 42 and the cover member 50 which has a central opening and carries a shade holder 51 to which the globe 52 is secured. A lamp 53 is connected to the socket 54 and serves to illuminate the globe 52. Rings 55 surround the containers 38 near their base and serve to prevent dust and dirt from accumulating in the sharp angles.

From the above it will be evident that I have produced an oil dispensing device that is so constructed that a large number of different grades of oils or lubricants can be kept in stock and readily dispensed and which is provided with display devices which contain samples of the oil or lubricant and which are illuminated from the inside whereby the samples can be clearly seen at night and which produce an attractive appearance.

Having described my invention, what is claimed as new is:

1. An oil dispensing device comprising a drain board, means for supporting said board, said drain board having an elongated central opening, a flange surrounding said opening, lugs extending inwardly into said opening, supporting means secured to said lugs and projecting upwardly therefrom, a dispensing head secured to and supported by said supports, said dispensing head having a downwardly projecting flange corresponding in size and shape with the upwardly projecting flange on the drain board and side members secured to said flanges.

2. An oil dispensing device comprising a drain board, means for supporting said board, said drain board having an elongated central opening, a flange surrounding said opening, lugs extending inwardly into said opening, supporting means secured to said lugs and projecting upwardly therefrom, a dispensing head secured to and supported by said supports, said dispensing head having a downwardly projecting flange corresponding in size and shape with the upwardly projecting flange on the drain board, side members secured to said flanges, said dispensing head having a plurality of chambers, a supply pipe connected to the lower wall of each chamber and a drain cock connected to each of the chambers.

3. An oil dispensing device, comprising, in combination, a base member adapted to rest upon a support, said member having an upwardly extending flange, a drain table located above said base member and connected to the latter, said drain table having a downwardly projecting flange, means for connecting the drain table to the base and for spacing the same therefrom, side members secured to said flanges so as to form an enclosed space, said drain board having an upwardly extending flange on its upper surface, said flange having straight parallel sides and curved ends, a hollow dispensing head supported from the table and spaced from the top thereof, said head having a downwardly extending flange located directly above the flange on the drain table and of the same size and shape as the latter, side members secured to said flanges so as to form an enclosure between the top of the table and the dispensing head, said head having a plurality of chambers, a supply pipe connected to each chamber and drain cocks connected to the two opposite sides of each of the chambers.

4. An oil dispensing device comprising, a drain board, means for supporting the drain board in an elevated position, said board having an opening, supporting means attached to the board and extending upwardly therefrom, an elongated dispensing head secured to the upper end of the supporting means, said head having a plurality of separate chambers spaced along its length, a supply pipe connected with each chamber and a dispensing faucet in communication with each chamber.

5. An oil dispensing device comprising, a drain board having an elongated central opening, means for supporting the board in an elevated position, supporting means secured to the board adjacent to the opening and extending upwardly therefrom, an elongated dispensing head secured to and supported by the upper end of the supporting means, said head having a plurality of separate chambers spaced apart along its length, supply pipes extending upwardly through the opening in the board and communicating with said chambers, there being one supply pipe for each chamber and two dispensing faucets in communication with each chamber, one on each side of the dispensing head whereby oil may be dispensed from both sides of the dispensing head.

In testimony whereof I affix my signature.

HAROLD G. DAVIS.